United States Patent
Hayashi

(10) Patent No.: US 7,359,092 B2
(45) Date of Patent: Apr. 15, 2008

(54) PICTURE IMAGE INPUT METHOD

(75) Inventor: Nobuhiro Hayashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 918 days.

(21) Appl. No.: 10/807,436

(22) Filed: Mar. 24, 2004

(65) Prior Publication Data

US 2004/0179732 A1    Sep. 16, 2004

Related U.S. Application Data

(63) Continuation of application No. 09/455,449, filed on Dec. 6, 1999, now abandoned, which is a continuation of application No. 08/879,042, filed on Jun. 19, 1997, now abandoned.

(30) Foreign Application Priority Data

Jun. 21, 1996   (JP) .................................. 8-161524

(51) Int. Cl.
*H04N 1/407* (2006.01)
*G06T 5/40* (2006.01)
(52) U.S. Cl. ..................... 358/3.21; 358/3.23; 382/169
(58) Field of Classification Search ................ 358/1.9, 358/3.01, 3.21, 3.23, 3.26, 521, 522; 382/168, 382/169, 274; 348/671, 672
See application file for complete search history.

(56) References Cited

U.S. PATENT DOCUMENTS

| 5,194,945 | A |   | 3/1993  | Kadowaki et al.  | 358/520 |
|-----------|---|---|---------|------------------|---------|
| 5,194,946 | A |   | 3/1993  | Morikawa et al.  | 358/505 |
| 5,394,194 | A | * | 2/1995  | Izawa et al.     | 348/672 |
| 5,410,418 | A |   | 4/1995  | Yonezawa         | 382/169 |
| 5,754,744 | A |   | 5/1998  | Matsumoto et al. | 358/1.13 |
| 5,781,315 | A |   | 7/1998  | Yamaguchi        | 358/520 |
| 5,946,109 | A | * | 8/1999  | Abe              | 358/474 |
| 5,978,106 | A | * | 11/1999 | Hayashi          | 358/518 |
| 7,006,668 | B2 * | 2/2006 | Iguchi et al.    | 382/169 |

* cited by examiner

*Primary Examiner*—Scott A. Rogers
(74) *Attorney, Agent, or Firm*—Oliff & Berridge, PLC

(57) ABSTRACT

A picture image input method includes inputting a picture image of an object as a picture image signal. A histogram of a frequency with respect to brightness information of the picture image signal is created. A first brightness is created, which is a maximum brightness value within a region not greater than a first frequency value on a low brightness side of a brightness value which is lower by the a preset amount than the maximum brightness value within the histogram. A brightness group on a low brightness side of the first brightness side in the histogram is detected. A substantially maximum brightness value in the brightness group is set as a highlight point of the object. A gradation conversion table is created, which converts gradations of the picture image signal on the basis of the highlight point.

12 Claims, 4 Drawing Sheets

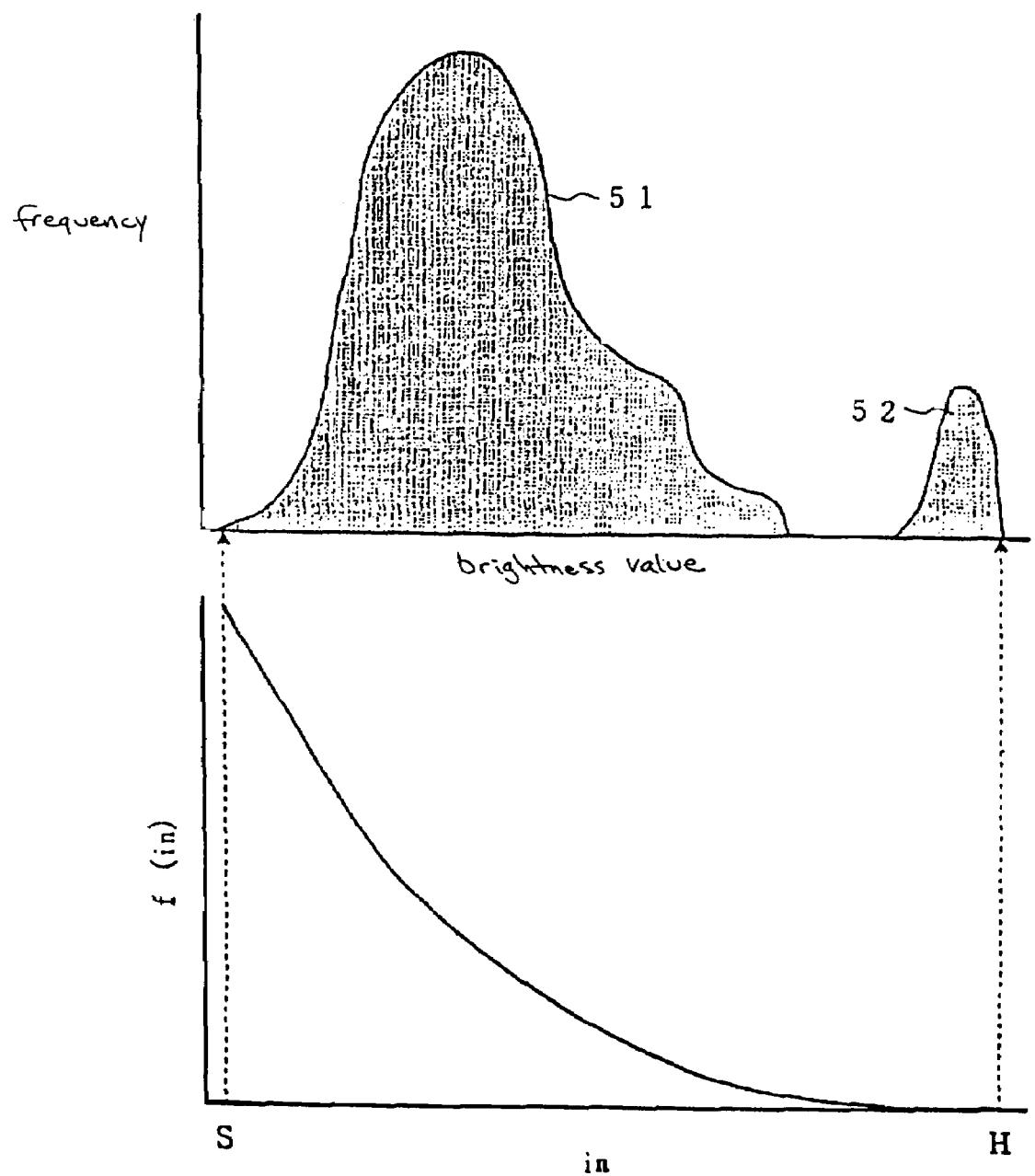

PICTURE IMAGE INPUT METHOD

This is a Continuation of application Ser. No. 09/455,449 filed Dec. 6, 1999, now abandoned which in turn is a Continuation of application Ser. No. 08/879,042 filed Jun. 19, 1997 now abandoned. The entire disclosure of the prior applications are hereby incorporated by reference herein in its entirety.

INCORPORATION BY REFERENCE

The disclosure of the following priority application is herein incorporated by reference: Japan Patent Application No. 08-161524, filed Jun. 21, 1996.

BACKGROUND OF THE INVENTION

1. Field of Invention

The invention relates to a picture image input method which optically inputs a picture image of an original medium.

2. Description of Related Art

A picture image input apparatus (scanner) optically inputs and photoelectrically converts a picture image of an original medium, and outputs this picture image as electronic data.

When the picture image of an original medium is input into this type of scanner, a look-up table is necessary in order to reproduce the object image. The look-up table, for example, merges a table used to revise variances characteristic of the apparatus and a table used for picture image adjustment according to commands from the user.

In the picture image input of a negative film (negative original medium) which is a transmissive original medium, a negative gradation conversion table, which converts the negative to a positive, is also merged into the look-up table.

Furthermore, in the picture image input of a negative film, a prescan must be performed in order to create the negative gradation conversion table. With the exception of creating the negative gradation conversion table, the prescan performs the same operations as the normal scan during picture image input.

The scanner can be connected to a host computer. Thus, the negative gradation conversion table can be created initially by commands from the host computer.

The operation of the scanner is discussed below. First, the scanner receives from the host computer the resolution, the picture image input range and the data in the look-up table. The linear negative gradation conversion table, which is the basis, is merged into the look-up table. The scanner, upon receiving from the host computer a command to start scanning, starts the prescan using the look-up table.

Next, the scanner creates a histogram of the brightness of the input picture image and the frequency thereof, as shown in FIG. 5a, from the picture image data input through the prescan.

The shadow point used to match the white point is found from the histogram. The white point is the location of the maximum value of the output of the negative gradation conversion table. In addition, the shadow point is the darkest location on the negative film, and is the brightest location of the original object. That is to say, the white point is the brightest location of the original object, and is the point which should be the brightest location in the data from the negative-to-positive conversion of the picture image which was input.

For example, from the histogram shown in FIG. 5a, the brightness value is added in the high direction from level 0. The value immediately prior to the cumulative frequency value which crosses 0.3% (cumulative frequency coefficient 1) of the total is made the shadow point S.

Conversely, the frequency value is added from the maximum level (4095 in the case of a 12-bit table) in the low direction. The value immediately prior to where the cumulative frequency value crosses 0.03% (cumulative frequency coefficient 2) of the total is made the highlight point H.

A negative gradation conversion table, in which the highlight point and the shadow point have been determined as described above, is shown in FIG. 5b.

In the scanner, the negative gradation conversion table obtained as described above is merged into the look-up table. The picture image data input by the actual picture image input is converted using this table and is sent to the host computer.

However, when the highlight point of the negative gradation conversion table is found as described above, the black level in the original object photographed on the negative film may not be correctly set.

For example, transparent portions, where the original medium picture image does not exist, may be included in the orange on which prescanning is performed. Thus, as shown in FIG. 5a, in the histogram which is obtained, a region 52 indicating a brightness distribution is created outside region 51 which indicates the correct brightness distribution.

In this state, when the highlight point is set as described above, the frequency is added from the maximum level of the region 52 in the low direction. The value immediately prior to the cumulative frequency value which crosses 0.03 of the total is utilized. Here, there is a large difference from the highlight point obtained from the region 51 which indicates the brightness distribution in the actual picture image.

Consequently, for example in the picture image input using the look-up table wherein the level of black of the object on the negative film is not correctly set, the picture image data which is obtained is too bright overall. This results in a picture image in which black is not well defined.

In addition, because of the influence of the colors of the film base of the negative film, the image is reproduced with a bluish coloration which is different from that of the actual original picture image.

SUMMARY OF THE INVENTION

In consideration of the foregoing, it is an object of the invention to reproduce with good accuracy an original picture image.

In accordance with the invention, the picture image input method inputs a picture image of fan object as a picture image signal. A histogram of the frequency with respect to the brightness information of the picture image signal is created. A first brightness is detected. The first brightness is the maximum brightness value within a region not greater than a first frequency value on a low brightness side of a brightness value which is lower by a preset amount from the maximum brightness value within the histogram. A brightness group on the low brightness side of the first brightness in the histogram is detected. The substantially maximum brightness value in the brightness group is set as the highlight point of the object. A gradation conversion table which converts the gradations of the picture image signal on the basis of the highlight point is created.

This affects the use of the distribution which appears in the high brightness side of the histogram. Specifically, the distribution in which there is a mountain shape on the high brightness side from the first brightness is not used as the picture image signal for the object.

Further objects, details and advantages of the invention will be apparent from the following detailed description, when read in conjunction with the drawings.

BRIEF DESCRIPTION OF THE DRAWINGS

FIGS. 5a and 5b are graphs showing an example of a conventional histogram and negative gradation conversion table, respectively.

DETAILED DESCRIPTION OF PREFERRED EMBODIMENTS

Figure 1:
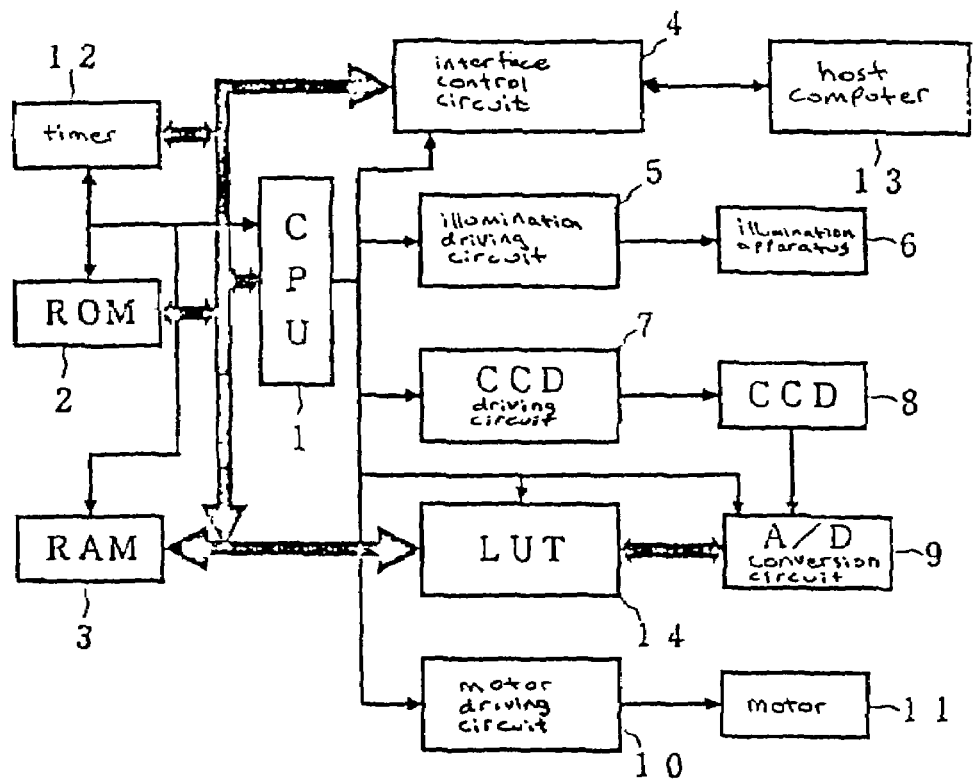
FIG. 1 is a block diagram showing a picture image input system in accordance with an embodiment of the invention.

FIG. 1 is a block diagram showing a picture image input system in accordance with an embodiment of the invention.

As shown in FIG. 1, a CPU 1 controls the operations of various components of the system. The CPU 1 executes the picture image input operations according to a program stored in a ROM 2.

In a RAM 3, the CPU 1 temporarily stores data and the like which are necessary to execute the various operations.

An interface circuit 4 is connected to a host computer 13. The interface circuit 4 outputs to the host computer 13 data of the picture image which has been input. The interface circuit 4 receives and transfers to the CPU 1 instructions and commands from the host computer 13.

An illumination driving circuit 5 is controlled by the CPU 1. The illumination driving circuit 5 drives an illumination apparatus 6 and causes light which is red R, green G and blue B to illuminate the original medium, i.e., the object of picture image input. Although not shown in the figures, it is assumed that a negative film, i.e., a transmissive original medium, is used as the negative original medium.

A CCD driving circuit 7 is controlled by the CPU 1. The CCD driving circuit 7 reads the original medium by driving a CCD 8.

The picture image data output from the CCD 8 is input into an A/D conversion circuit 9. Subsequent to undergoing A/D conversion, the picture image data is sent to, and stored in, the RAM 3. This data undergoes a conversion operation by a look-up table 14.

A motor driving circuit 10 is controlled with a preset timing by the CPU 1. The motor driving circuit 10 causes the original medium to move in increments along one line by driving a motor 11. A timer 12 temporarily performs a timing operation. The timer 12 supplies the time information to the CPU 1.

The above discussion describes the element of the scanner, except for the host computer 13.

Figure 2:
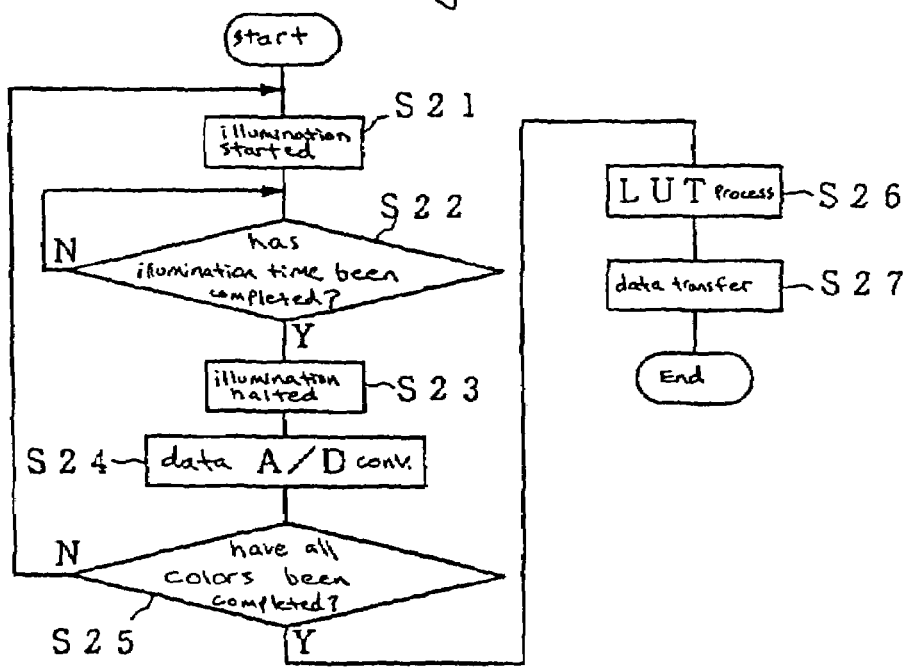
FIG. 2 is a flowchart showing basic operations of the picture image input system of FIG. 1.

The basic operations of the picture image input system are described with reference to the flowchart shown in FIG. 2.

First, in step S21, the CPU 1 causes the illumination apparatus 6 to be driven by controlling the illumination driving circuit 5. Through this operation, the illumination apparatus 6 first illuminates the original medium with red R light. The CPU 1 starts to measure the red R light illumination time by using the time information simultaneously obtained from the timer 12.

On the other hand, the CPU 1 causes the CCD 8 to be driven by controlling the CCD driving circuit 7. The original medium picture image is input by the illumination of the illumination apparatus 6.

Through this operation, the CCD 8 accumulates the light corresponding to the red R picture image along one line.

Next, in step S22, the CPU 1 determines whether or not the measured time is a preset value. Specifically, the CPU 1 determines whether or not the preset illumination time has been completed.

When the CPU 1 determines that the preset illumination time has been completed, the program proceeds to step S23. The CPU 1 causes the illumination apparatus 6 to stop by controlling the illumination driving circuit 5. Thus, the illumination is completed. When the illumination time is not completed, the CPU 1 continues to cause the illumination apparatus 6 to be driven by controlling the illumination driving circuit 5.

Next, in step S24, the CPU 1 causes the red R data which is accumulated in the CCD 8 to be output to the A/D conversion circuit 9. The CPU 1 causes the red R data received by the A/D conversion circuit 9 to undergo A/D conversion. The CPU 1 sends the data which has undergone A/D conversion to the RAM 3 and stores the data there.

In step S25, the CPU 1 determines whether or not the above-described data input has been completed for all of the colors, i.e., RGB. Furthermore, when it is determined that the data input has been completed four all colors, the program proceeds to the next step, i.e., step S26.

Thus, the above-described series of operations, which include light illumination, picture image input, A/D conversion and data storage are performed for the three colors RGB. Subsequent to the series of operations, the program proceeds to the next step, i.e., step S26.

Next, the CPU 1, in step S26, performs a conversion process on the data stored in the RAM 3. The CPU 1 performs the conversion process by using the look-up table 14.

When the conversion process is completed, the CPU 1, in step S27, sends the converted data to the host computer 13 via the interface control circuit 4.

Through this operation, the inputting of one line of picture image data is accomplished.

The CPU 1 supplies a line start trigger signal to the motor driving circuit 10, and causes the motor 11 to be driven. Driving the motor 11 causes the relative position between the original medium and the CCD 8 to move by one line. The operations of steps S21 through S27 are repeated and the picture image input of the next line is accomplished. By repeating the above-described steps for a predetermined number of lines, the picture image data for the whole original medium is input.

The creation of the negative gradation conversion table in accordance with this embodiment of the invention is described with reference to FIGS. 3 and 4.

The above-described picture image input system sets up a negative picture image input. In order to obtain the information needed for this set up, picture image input is accomplished broadly by performing a prescan in the picture image input system and the look-up table 14 is created.

Figure 3:
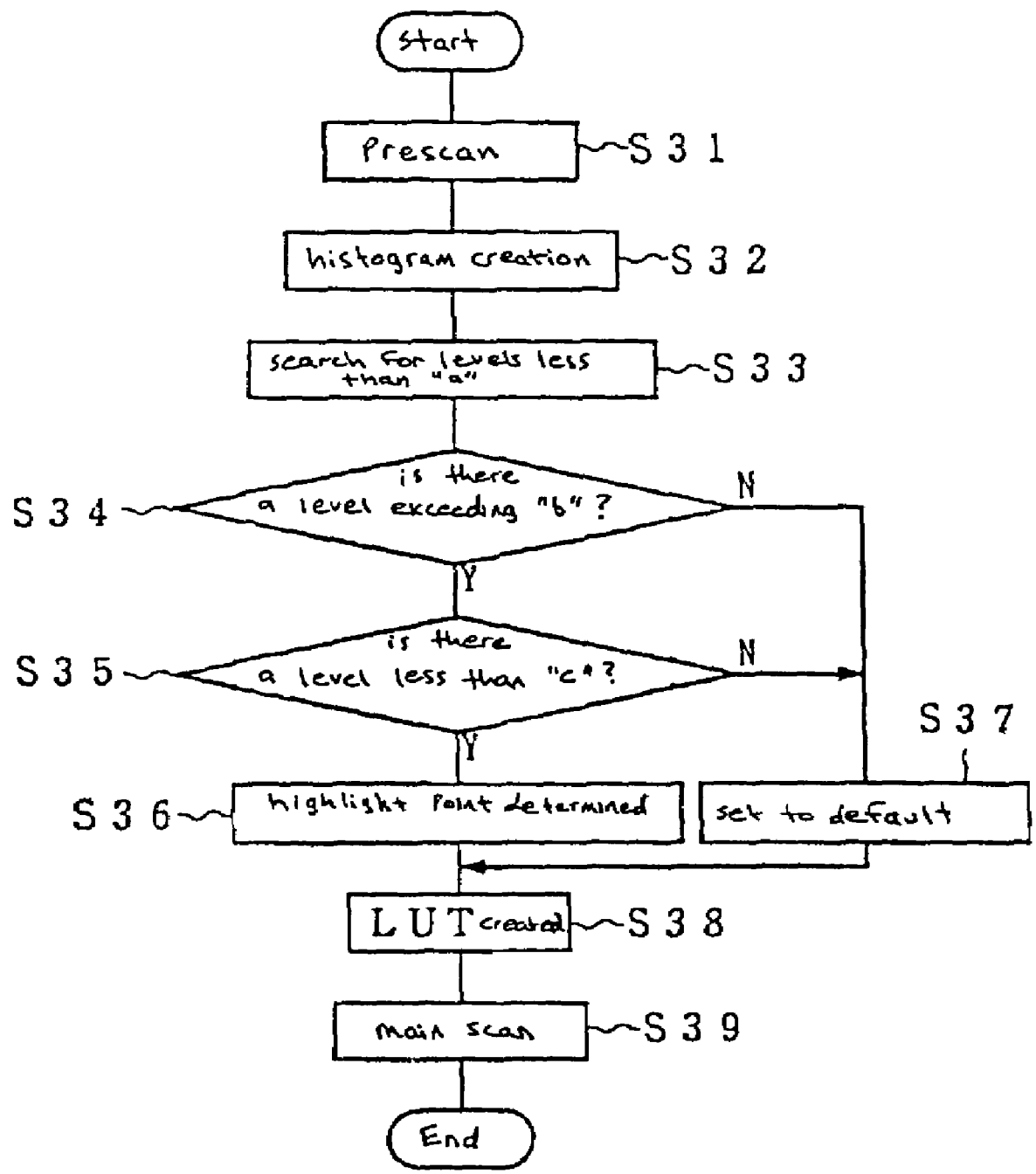
FIG. 3 is a flowchart showing the creation of a negative gradation conversion table.

The flowchart of FIG. 3 shows the creation of this look-up table 14.

First, in step S31, the CPU 1 inputs a picture image through a prescan in accordance with a program stored in the ROM 2.

In this prescan, picture image input is performed using a negative gradation conversion table with linear properties as the base.

The range of the picture image input by the prescan is basically a region wherein the horizontal and vertical lengths of the picture image input region which is set by the user are shrunk to 90%, uniformly left-to-right and up-and-down.

However, when the minimum input range is determined and the picture image input region is set to be smaller than the minimum input range, the prescan is accomplished by extending the region to the minimum input range, uniformly in each direction.

When the picture image input region which is set is in a corner of the entire region and thus cannot be extended uniformly to the minimum input range, the region is extended in the directions in which extension is possible.

The resolution of the picture image input in the prescan is determined in accordance with the size of the picture image input region set by the user. When the picture image input region is small, the resolution is high. In addition, when this picture image input region is large, the resolution is set low.

This operation avoids situations in which the number of pixels of the input picture image is too small and a histogram having the necessary information cannot be obtained. This operation also avoids situations in which the scanning time becomes excessively long because the number of pixels is larger than necessary in the input picture image.

Figures 4A, 4B:
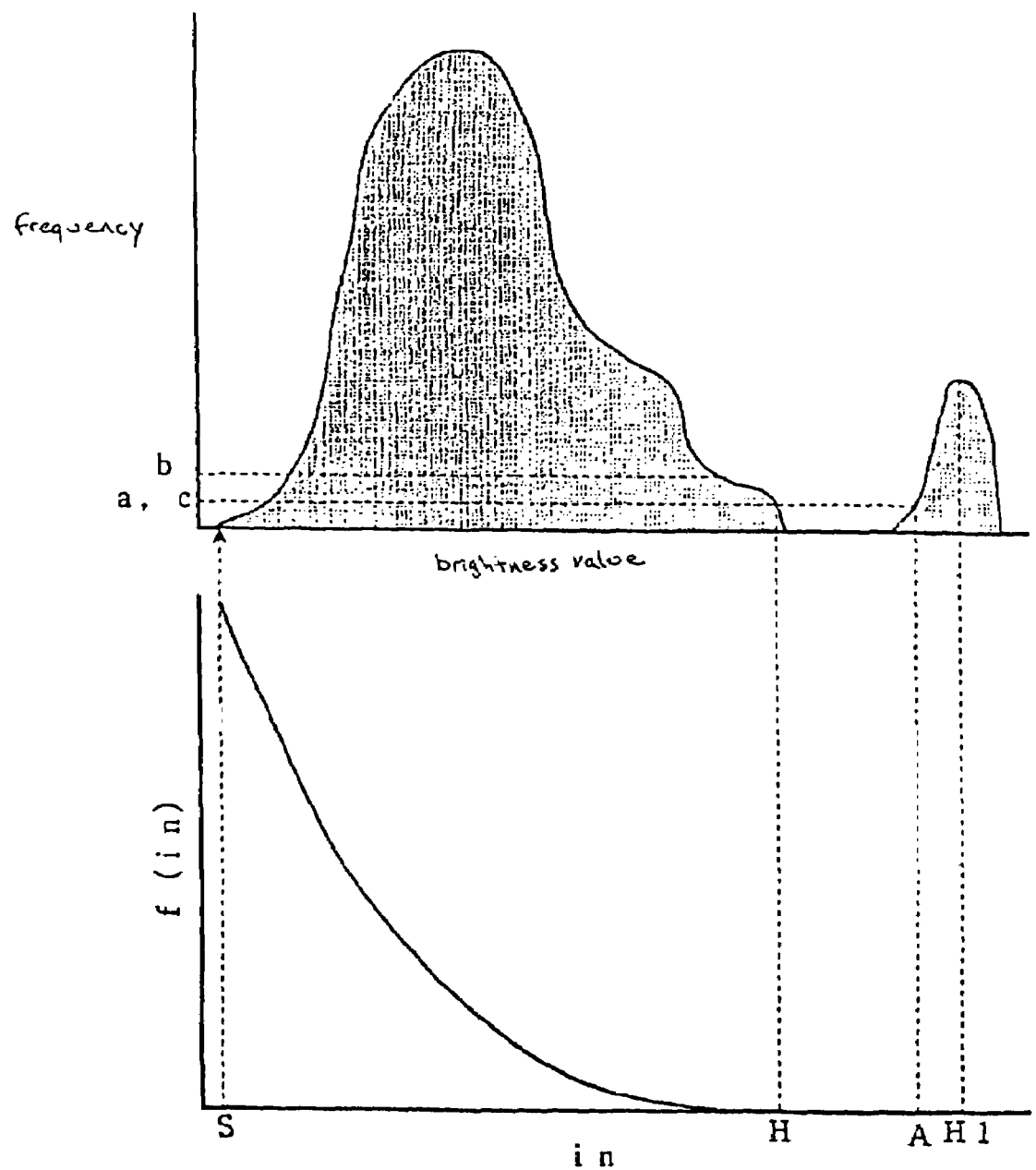
FIGS. 4a and 4b are graphs showing a histogram and a negative gradation conversion table, respectively, in accordance with an embodiment of the invention.

The CPU 1, in step S32, creates a histogram as shown in FIG. 4a. The histogram is created,through the picture image data input by the prescan. Specifically, the histogram is created by adding the number of pixels for each color RGB at each brightness level through the picture image input by the prescan.

In step S33, the CPU 1 determines the location of the brightness value A which has a frequency less than a first value "a" and in which the brightness of the histogram is to the low brightness side of H1. For example, the first frequency value "a" may be 0.63% of the total pixels of the picture image input by the prescan.

The region up to the first frequency value "a" detected from the maximum brightness side can be determined to be the transparent portion.

However, the brightness H1 is the brightness which gives the substantially maximum frequency value of the distribution showing the transparent portion. The scanner is set so that the maximum brightness when the light is input without an original medium is the maximum value of the data output from the scanner.

In this setting, the picture image input is accomplished for the transparent portion in which the picture image of the negative film is not photographed. The brightness where the frequency value of the histogram obtained at this time is a maximum is determined in advance.

In accordance with this method, a value which is measured in advance is used as the brightness H1.

Next, in step S34, the CPU 1 finds a frequency value which is further in the low brightness direction. The CPU 1 determines whether or not there is a point where the frequency exceeds a second value "b". For example, the second frequency value "b" may be 0.05% of the total pixels of the picture image input by the prescan.

If there is no level which exceeds the second frequency value "b" in this determination, the program proceeds to step S37, and the CPU 1 makes the highlight point the default value stored in the ROM 2.

However, when there is a level which exceeds "b" in the determination of step S34, the program proceeds to the next step, i.e., step S35.

In step S35, the CPU finds a frequency value in the direction of high brightness. The CPU 1 determines whether or not there is a point where the frequency is less than a third frequency value "c". For example, the third frequency value "c" may be 0.03% of the total pixels of the picture image input by the prescan.

If there is no level which is less than the third frequency value "c" in this determination, the program proceeds to step S37, and the CPU 1 makes the highlight point the default value stored in the ROM 2.

However, when there is a level less than "c" in the determination of step S35, the program proceeds to the next, i.e., step S36.

In step S36, the CPU 1 sets the point which is detected by the determination of step S35 as the highlight point H.

In step S38, the CPU 1 creates the negative gradation conversion table as shown in FIG. 4b. The negative gradation conversion table is created using the highlight point H which was obtained.

In the creation of the negative gradation conversion table, frequency values are added toward the high direction from level 0 of the histogram. The value immediately prior to the accumulated frequency value which exceeds 0.03% of the total number of pixels is set as the shadow point S. The total number of pixels used at thins time is set so as to exclude the number of pixels in the region up to the brightness value "a" from the maximum brightness side, which is the region determined to be the transparent portion. Through this operation, it is possible to find the shadow point accurately even if the size of the transparent portion changes.

In summary, the histogram shown in FIG. 4a is divided into two portions, i.e., the large peak on the left side is data of the object, and the small peak on the right side is data of a transparent region having no film. The first frequency value "a" is used to find point "A", which is the lower limit in the histogram of a range in which the data accumulated from scanning the transparent region is distributed. Specifically, the frequency values from the high brightness side to the low brightness side are searched and a point that is below the first frequency value "a" is set as point "A", and it is determined that the data of the transparent region stops at point "A".

Frequency values continue to be searched, and when a point exceeds the second frequency value "b", it is determined that it has entered into the region of the object data. Also the frequency values are searched in the reverse direction to find the point at which the object data begins, to find the point at which the frequency value becomes the third frequency value "c" or less. This point is highlight point "H".

Thus, the first frequency value "a" is the coefficient for determining the end of the transparent area, and the third frequency value "c" is the coefficient for determining the beginning of the object area. As shown in FIG. 4a, the first and third frequency values "a" and "c" can have the same values, e.g., 0.03% of the total number of pixels acquired by prescanning. However, the first and third frequency values "a" and "c" do not have to be the same, and are independent coefficients. The first, second and third frequency values "a", "b" and "c" are values that are sought empirically, and are determined from the results of experiments with various documents such that the object and the transparent areas can be divided without error. The allowable range of these values is wide, and strictly optimized values are not sought.

The negative gradation conversion table is created from the highlight point and shadow point which are determined. The negative gradation conversion table is merged into the look-up table 14. Next, in step S39, the CPU 1 performs the main scan using the look-up table 14 which has been obtained.

In the above description, the CPU 1 creates a negative gradation conversion table, but this is intended to be illustrative and not limiting.

Naturally, it would also be acceptable for the CPU 1 to first send the data which is input by the prescan to the host computer 13 via the interface control circuit 4 and for the negative gradation conversion table to be created in the host computer 13.

It would also be acceptable for the negative gradation conversion table which is created in the host computer 13 to be passed to the CPU 1 via the interface control circuit 4 and to be merged into the look-up table 14.

In accordance with the invention described above, a picture image of an object is input as a picture image signal. A histogram of the frequency with respect to the brightness information of the picture image signal is created. A first brightness is detected. The first brightness is the maximum brightness value within a region not greater than a first frequency value on a low brightness side of a brightness value which is lower by a preset amount from the maximum brightness value within the histogram. A brightness group on the low brightness side of the first brightness in the histogram is detected. The substantially maximum brightness value in the brightness group is set as the highlight point of the object. A gradation conversion table which converts the gradations of the picture image signal on the basis of the highlight point is created.

This affects the use of the distribution which appears in the high brightness side of the histogram. Specifically, the distribution in which there is a mountain shape on the high brightness side from the first brightness is not used as the picture image signal for the object.

Consequently, even if the transparent portion where the original medium picture image does not exist is included, it is possible to determine the highlight point which excludes this portion. Thus, it is possible to create a more accurate gradation conversion table and to reproduce the status of the original picture, image with better accuracy.

While this invention has been described in conjunction with, specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A picture image input method, comprising:
   inputting a picture image of an object as a picture image signal;
   creating a histogram of a frequency with respect to brightness information of the picture image signal;
   detecting a first brightness which is a maximum brightness value within a region not greater than a first frequency value on a low brightness side of a brightness value which is lower by a preset amount than the maximum brightness value within the histogram;
   detecting a brightness group on a low brightness side of the first brightness in the histogram;
   setting a substantially maximum brightness value in the brightness group as a highlight point of the object; and
   creating a gradation conversion table which converts gradations of the picture image signal on the basis of the highlight point.

2. The picture image input method according to claim 1, further including:
   detecting a second brightness value which is a maximum brightness value in a range of a second frequency value or greater on the low brightness side of the first brightness; and
   detecting a third brightness value which is a minimum brightness value in the range of a third frequency value or less on a high brightness side of the second brightness;
   wherein brightness values not greater than the third brightness value constitute the values of the brightness group.

3. The picture image input method according to claim 2, wherein:
   the third brightness value is set as the highlight point.

4. The picture image input method according to claim 1, further including:
   inputting a second picture image of an object as a second picture image signal; and
   converting gradations of the second picture image signal by the gradation conversion table.

5. The picture image input method according to claim 1, wherein:
   the gradation conversion table is a positive picture image gradation conversion table which outputs a maximum value with respect to the input value of the highlight point.

6. The picture image input method, according to claim 1, wherein:
   the gradation conversion table is a negative picture image gradation conversion table which outputs a minimum value with respect to the input value of the highlight point.

7. A picture image input apparatus, comprising:
   means for inputting a picture image of an object as a picture image signal;
   means for creating a histogram of a frequency with respect to brightness information of the picture image signal;
   means for detecting a first brightness which is a maximum brightness value within a region not greater than a first frequency value on a low brightness side of a brightness value which is lower by a preset amount than the maximum brightness value within the histogram;
   means for detecting a brightness group on a low brightness side of the first brightness in the histogram;
   means for setting a substantially maximum brightness value in the brightness group as a highlight point of the object; and
   a processor which creates a gradation conversion table which converts gradations of the picture image signal on the basis of the highlight point.

8. The picture image input apparatus according to claim 7, further including:
   means for detecting a second brightness value which is a maximum brightness value in a range of a second frequency value or greater on the low brightness side of the first brightness; and means for detecting a third brightness value which is a minimum brightness value in the range of a third frequency value or less on a high brightness side of the second brightness;

wherein brightness values not greater than the third brightness value constitute the values of the brightness group.

9. The picture image input apparatus according to claim 8, wherein:

the third brightness value is set as the highlight point.

10. The picture image input apparatus according to claim 7, further including:

means for inputting a second picture image of an object as a second picture image signal; and means for converting gradations for the second picture image signal by the gradation conversion table.

11. The picture image input apparatus according to claim 7, wherein:

the gradation conversion table is a positive picture image gradation conversion tale which outputs a maximum value with respect to the input value of the highlight point.

12. The picture image input apparatus according to claim 7, wherein:

the gradation conversion table is a negative picture image gradation conversion table which outputs a minimum value with respect to the input value of the highlight point.

* * * * *